United States Patent
Eldar et al.

(10) Patent No.: US 8,139,683 B2
(45) Date of Patent: Mar. 20, 2012

(54) RECEIVER AND A METHOD FOR CHANNEL ESTIMATION

(75) Inventors: Lior Eldar, Hertzliya (IL); Ron Bercovich, Kfar-Saba (IL)

(73) Assignee: Freescale Semiconductor, Inc., Austin, TX (US)

( * ) Notice: Subject to any disclaimer, the term of this patent is extended or adjusted under 35 U.S.C. 154(b) by 628 days.

(21) Appl. No.: 12/066,227

(22) PCT Filed: Sep. 9, 2005

(86) PCT No.: PCT/IB2005/052954
§ 371 (c)(1),
(2), (4) Date: Nov. 20, 2008

(87) PCT Pub. No.: WO2007/029052
PCT Pub. Date: Mar. 15, 2007

(65) Prior Publication Data
US 2009/0129489 A1    May 21, 2009

(51) Int. Cl.
*H03K 9/00* (2006.01)

(52) U.S. Cl. ........ 375/316; 375/349; 375/347; 375/260; 375/267

(58) Field of Classification Search ............... 375/316, 375/349, 347, 260, 267
See application file for complete search history.

(56) References Cited

U.S. PATENT DOCUMENTS

2005/0135509 A1 * 6/2005 Mantravadi et al. ......... 375/340
2005/0163257 A1   7/2005 Keerthi

FOREIGN PATENT DOCUMENTS

| EP | 1320232 A2 | 6/2003 |
|----|------------|--------|
| WO | 2005076558 A1 | 8/2005 |

OTHER PUBLICATIONS

IEEE Standard 802.16-2004/IEEE 802.16e, Oct. 2004, USA.
Negi, et al; "Pilot tone selection for channel estimation in a mobile OFDM system"; IEEE Transactions on Consumer Electronics, vol. 44, No. 3, Aug. 1998.
Roy et al; "ESPRIT—Estimation of signal parameters via rotational invariance techniques" IEEE Transactions on Acoustics, Speech, and Signal Processing, vol. 37, No. 7, Jul. 1989.
Ragahavendra et al; "Fast multipath delay estimation in OFDM systems using frequency swept pilots" 9th International OFDM Workshop, 2004 Dresden.

* cited by examiner

*Primary Examiner* — Kabir A Timory

(57) ABSTRACT

A receiver and a method for channel estimation, the method includes calculating at least one initial channel estimate; characterized by calculating an estimate of the channel based upon a mathematical relationship between a first group of pilot subcarriers and a second group of pilot subcarriers;

whereas a difference between locations of pilot subcarriers of the first group and locations of corresponding pilot subcarriers of the second group is substantially constant; and at least one of the following conditions are fulfilled: (i) pilot subcarriers that belong to the same group of subcarriers are non-evenly spaced in a frequency domain, (ii) a pilot subcarrier of the first group and a corresponding pilot subcarrier of the second group are proximate to each other in the frequency domain.

20 Claims, 9 Drawing Sheets

RECEIVER AND A METHOD FOR CHANNEL ESTIMATION

FIELD OF THE INVENTION

The invention relates to a receiver and a method for channel estimation, especially in a multiple user environment.

BACKGROUND OF THE INVENTION

Recent developments in telecommunication and semiconductor technologies facilitate the transfer of growing amounts of information over wireless networks. One of the methods for transmitting large amounts of information over wireless medium is known as Orthogonal Frequency Division Multiples (OFDM). In this method multiple subcarriers are used simultaneously to convey wideband (and even ultra wide band) symbols.

Some prior art methods for performing channel estimation were based upon transmitting pilot symbols that were conveyed over subcarriers (pilot subcarriers) that were evenly spaced in the frequency domain. The need to use evenly spaced pilot subcarriers is discussed in "Pilot tone selection for channel estimation in a mobile OFDM system", R. Negi and J. Cioffi, IEEE Transactions on Consumer Electronics, Vol. 44, No. 3, August 1998.

The use of evenly spaced pilot subcarriers allows to apply the ESPRIT algorithm for estimating the locations (delays) of the taps of the channel impulse response. The ESPRIT algorithm was initially developed for finding oil wells (see: "ESPRIT—Estimation of signal parameters via rotational invariance techniques", R. Roy and T. Kailath, IEEE Transactions on Acoustics, Speech, and Signal Processing, Vol. 37, No. 7, July 1989).

The implementation of the ESPRIT algorithm to channel estimation is discussed in "Fast multipath delay estimation in OFDM systems using frequency swept pilots", M. R. Ragahavendra, S. Bhashyam and K. Giridhar, $6^{th}$ International OFDM-workshop, Dresden. All these mentioned above articles and incorporated herein by reference.

There are various versions of OFDMA schemes. An evenly spaced OFDMA scheme allocated pilot subcarriers that are evenly spaced from each other to a certain user. A non-evenly spaced OFDMA allocation scheme allocates pilot subcarriers that are not necessarily evenly spaced in the frequency domain. Typically, there is a much higher probability that these pilot subcarriers are not evenly spaced.

U.S. patent application 2005/0163257 of Keerthi, which is incorporated herein by reference, describes an evenly spaced OFDMA scheme compliant channel estimation method.

Some transmission schemes, such as non-evenly spaced OFDMA schemes, dynamically allocate transmission resources to one or more users. These transmission schemes allocate multiple pilot subcarriers and multiple information conveying subcarriers to multiple users simultaneously. The distance between the different pilot subcarriers allocated to a certain user are usually not equal. Thus, according to common practice the ESPRIT algorithm can not be applied in non-evenly spaced OFDMA multiple users systems.

A typical non-evenly spaced OFDMA system transmits wideband symbols that are conveyed over 2048 subcarriers, out of which 1680 subcarriers convey information or pilot information, as well as 368 guard subcarriers that do not convey information. Each subcarrier out of the 1680 subcarriers is also referred to as a useful subcarrier.

Three consecutive OFDMA symbols form a slot. Thus, a slot includes the subcarriers that are transmitted during three consecutive symbols.

The useful subcarriers of a slot are arranged in subcarrier tiles. A tile, such as subcarrier tile 10 of FIG. 1, includes four useful subcarriers at each of the three timeslots. The subcarrier tile 10 includes eight information conveying subcarriers 11 and four pilot subcarriers 12-18. The pilot subcarriers 12, 14 16 and 18 are located at the four corners of the subcarrier tile 10. The difference (in the frequency domain) between pilot subcarriers 12 and 14 equals the difference between pilot subcarriers 16 and 18.

FIG. 2 illustrates multiple subcarriers tiles 10-60 that are allocated to a single subchannel.

Each user in the multiple user environment can utilize one or more subchannel. Each subchannel includes one set of six different subcarrier tiles, such as subcarrier tiles 10-60.

Subcarrier tile 20 includes pilot subcarriers 22, 24 26 and 28, subcarrier tile 30 includes pilot subcarriers 32, 34 36 and 38, subcarrier tile 40 includes pilot subcarriers 42, 44 46 and 48, subcarrier tile 50 includes pilot subcarriers 52, 54 56 and 58, and subcarrier tile 60 includes pilot subcarriers 62, 64 66 and 68. These pilot subcarriers are located at the corner of each subcarrier tile.

Each subcarrier tile (10-60) out of the set is randomly selected from a group (91-96) of subcarrier tiles. Each group 91-96 of subcarrier tiles includes seventy consecutive subcarrier tiles.

The difference (in the frequency domain) between different subcarrier tiles that belong to the same subchannel is not equal. More exactly, the probability that the difference is the same is very low.

There is a need to provide an efficient channel estimation method and a receiver that use pilot subcarriers that are not necessarily evenly spaced in the frequency domain.

SUMMARY OF THE PRESENT INVENTION

A receiver and a method for channel estimation, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

A channel response can be expressed in the frequency domain (and is usually referred to as a channel frequency response) or in the time domain (and is usually expressed as a channel impulse response). Those of skill in the art will appreciate that various illustrated stages of various methods can be executed in either domains without departing from the scope of the invention.

The following description relates to various portions of a reception process. For convenience of explanation various stages such as an analog to digital conversion of received signals, parallel to serial conversion, prefix removal, separation between different subchannels (that are allocated to different users), and the like are not illustrated for convenience of explanation only.

In the following description capital letters denote vectors or matrices, $(\ )^T$ represents a transpose, $(\ )^*$ represents a complex conjugate, $(\ )^H$ represents a Hermitian, $\|\ \|$ represents an absolute value, $\lfloor\ \rfloor$ represents the integer nearest to the value within the parenthesis, $N_s$ is the number of subchannels allocated to a user, I is an identity matrix that includes ones in its diagonal and zero elsewhere, $e_i$ is a vector that includes one at the $i^{th}$ element and zero elsewhere.

Wireless channels are characterized by multipaths—a transmitted symbol can propagate over multiple paths before it reaches the receiver. The multipath phenomena (and optionally additional phenomena) is expressed by the channel impulse response.

A typical channel impulse response includes multiple significant taps—taps that have a gain (also known as amplitude) that is above a certain threshold. For convenience of explanation the non-significant taps are not taken into account and the significant taps are referred to as taps.

Each tap is characterized by a complex gain ($h_m$) and is located at certain delay $l_m$. Assuming that there are L significant taps then the channel impulse response can be expressed by the following equation:

$$h(l) = \sum_{m=0}^{L-1} h_m \delta(l - l_m).$$

Usually, the number (L_max) of taps corresponds to the number of paths. The number of paths can be calculated according to various prior art methods.

Figure 3:
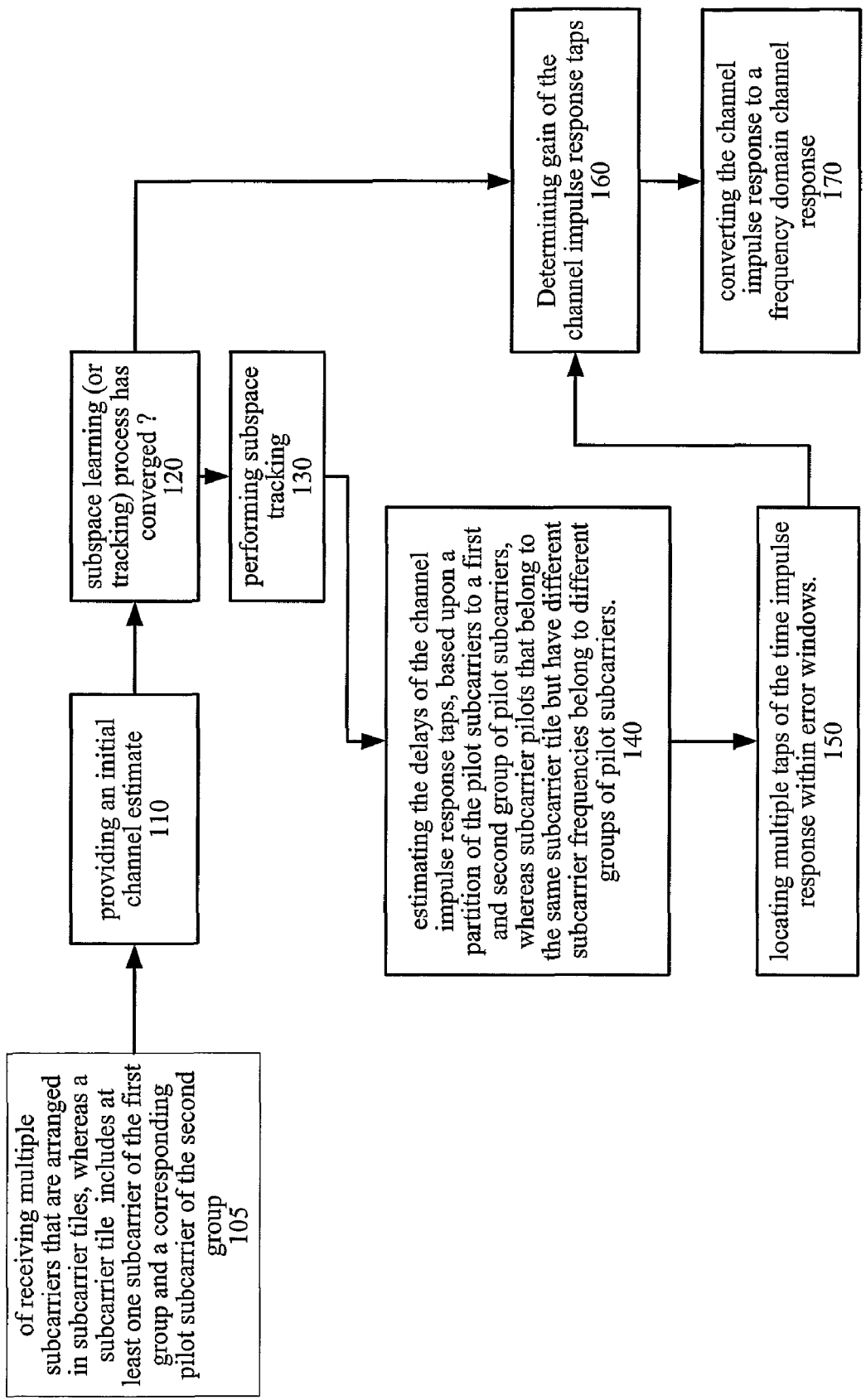
FIG. 3 illustrates a flow chart of a channel estimation method according to an embodiment of the invention.

FIG. 3 illustrates a flow chart of a method 100 for channel estimation according to an embodiment of the invention.

Method 100 starts by stage 105 of receiving multiple subcarriers that are arranged in subcarrier tiles, whereas a subcarrier tile includes at least one subcarrier that belongs to a first group of pilot subcarrier and a corresponding pilot subcarrier that belongs to a second group of pilot subcarriers.

Stage 105 is followed by stage 110 of providing an initial channel estimate. Stage 110 can include applying various well known algorithms, such as least square error estimations. The initial channel estimate can be expressed in the frequency domain or in the time domain.

Assuming that the channel includes M paths then the relationship between the transmitted signals and the received signals, in the frequency domain, has the following format:

$$Y_n = H_n X_n + V_n \qquad (1)$$

Whereas M is the number of users, $X_{i,n}$ is a K×K diagonal matrix ($X_{i,n,0}, \ldots X_{i,n,K-1}$) and $H_{i,n}$ is a K×1 channel response vector corresponding to the $i^{th}$ user in the $n^{th}$ symbol. A diagonal matrix can include non-zero elements only at its diagonal. $V_n$ is a noise vector that represents a white additive Gaussian noise that is characterized by zero mean, variance of $\sigma^2$ and an auto-covariance matrix of $\sigma^2 I_{Ku}$. $I_{Ku}$ is a $K_u \times K_u$ identity matrix, and $K_u$ is the number of useful subcarriers.

$K_p$ ($Kp=12*N_s$) pilot subcarriers are allocated to a certain user (to form a certain subchannel). These $K_p$ pilot subcarriers are transmitted in the first and third symbols of each symbol triad (time slot). The pilot subcarriers (total of $12*N_s$ pilot subcarriers) that are transmitted during the first timeslot are referred to as the first group of pilot subcarriers, while the pilot subcarriers (total of $12*N_s$ pilot subcarriers) that are transmitted during the third timeslot are referred to as the second group of pilot subcarriers. The first group of pilot subcarriers can include, for example, pilot subcarriers 12, 14, 22, 24, 32, 34, 42, 44, 52, 54, 62 and 64, and the other second group of pilot subcarriers can include, for example, pilot subcarriers 16, 18, 26, 28, 36, 38, 46, 48, 56, 58, 66 and 68.

Those of skill in the art will appreciate that the invention can be applied to first and second groups of subcarrier pilots that differ from the first and second groups of subcarrier pilots mentioned above. For example, the invention can applied when the subcarrier pilots do not belong to subcarrier tiles. It is noted that various exemplary groups of pilot subcarriers are discussed in FIG. 5 and FIG. 6.

It is further noted that the allocation of subcarrier pilots per user does not necessarily require applying random or pseudo random processes.

The initial channel estimate is responsive to the received first and second groups of pilot subcarriers. Conveniently, a first initial channel estimate ($\hat{H}_{ls,1}$) is provided for the first group of pilot subcarriers and a second initial channel estimate ($\hat{H}_{ls,2}$) is provided for the second group of pilot subcarriers.

The general format of the initial channel estimate can be written as:

$$\hat{H}_{ls,n} = X'^{-1}_n Y'_n = F' h_n + X'^{-1}_n V'_n = F' h_n + W'_n \qquad (2)$$

Whereas F' is a modified Discrete Fourier Transform matrix that includes rows that correspond to pilot subcarrier positions, and whereas index n equals one for the first symbol and equals two for the second symbol.

Stage 110 is followed by query stage 120 of determining if a subspace learning (or tracking) process has converged. This subspace is spanned by the initial channel estimates $\hat{H}_{ls,1}$ and $\hat{H}_{ls,2}$ If the answer is positive then query stage 120 is followed by stage 160 of determining gain of the channel impulse response taps. Else, query stage 120 is followed by stage 130 of performing subspace tracking.

Conveniently, the convergence is tested by comparing a current norm (Frobenius norm) of a matrix of difference between $Q_n$ matrix and a previous matrix $Q_{n-1}$ matrix. If the norm is less than a predefined threshold (for example 5% of the original norm) then the process has converged.

Matrix $Q_n$ is expected to converge to a matrix that includes the eigen-vectors of the auto-covariance matrix of $H_{LS}$. The calculation of matrix $Q_n$ occurs during stage 130.

Stage 130 includes applying each pilot symbol vector (the first vector represents the pilot vector of the first symbol and the second represents the pilot vector of the second symbol) consecutively to a delay subspace tracker, which computes the subspace spanned by the initial channel estimates $H_{LS,1}$, $H_{LS,2}$.

Stage 130 conveniently involves solving the following equations:

$$\hat{H}'_{re,n} = \begin{bmatrix} \hat{H}'_{0,n} \\ \hat{H}'_{e,n} \end{bmatrix} = H'_{re,n} + W'_{re,n}; \qquad (3)$$

$$\hat{H}'_{0,n} = J_1 \hat{H}'_{ls,n}; \hat{H}'_{e,n} = J_2 \hat{H}'_{ls,n} \qquad (4)$$

$$J_1 = \left[ e_1, 0, e_2, 0 \ldots e_{\frac{Kp}{2}}, 0 \right]; \qquad (5)$$

$$J_2 = \left[ 0, e_1, 0, e_2, 0 \ldots e_{\frac{Kp}{2}} \right]; \qquad (6)$$

$$H'_{re,n} = \begin{bmatrix} F'_0 h_n \\ F'_e h_n \end{bmatrix} = \begin{bmatrix} F'_0 h_n \\ \Phi F'_0 h_n \end{bmatrix} \qquad (7)$$

$$Q_n = \begin{bmatrix} I'_{Lm} \\ 0_{Kp-Lm} \end{bmatrix}; \qquad (8)$$

$$C_0 = I_{Lm}; \qquad (9)$$

$$A_0 = 0_{Kp-Lm} \qquad (10)$$

$$Z_n = Q^H_{n-1} \hat{H}'_{re,n}; \qquad (11)$$

$$A_n = \frac{1}{n}\{(n-1)A_{n-1}C_{n-1} + \hat{H}'_{re,n}Z^H_n\}; \qquad (12)$$

$$A_n = Q_n R_n; C_n = Q^H_{n-1} Q_n \qquad (13)$$

Whereas equations (3)-(7) illustrates the separation of the initial channel estimates into odd rows and even rows, and then concatenating the two into a single matrix. Equations (8)-(10) illustrates an initialization of the delay subspace tracker. Equations (11)-(12) illustrate an update of the delay subspace tracker. Equation (13) illustrates a decomposition of matrix $A_n$.

Stage 130 is followed by stage 140 of estimating the location (delays) of the channel impulse response taps, based upon a partition of the pilot subcarriers to a first and second group of pilot subcarriers, whereas subcarrier pilots that belong to the same subcarrier tile but have different subcarrier frequencies belong to different groups of pilot subcarriers.

Stage 140 may involve applying the ESPRIT algorithm on various mathematical entities associated with (or representative of) the first and second groups of pilot subcarriers or symbols.

According to an embodiment of the invention stage 140 includes extracting from matrix Qn, two matrixes $U_1, U_2$ that are later used in a channel delays estimation algorithm. Matrix $U_1$ includes the first Kp/2 rows of $Q_n$, and first $L_{max}$ columns of each row, and matrix $U_2$ includes the last Kp/2 rows of Qn, and the first $L_{max}$ columns of each row.

According to an embodiment of the invention the separation can occur after a result is achieved.

Conveniently, stage 140 includes solving the matrix equation: $U_1 \Psi = U_2$, using singular value decomposition (SVD) technique on the normal form of the above equation:

$$U_1 = \lfloor G_1 D G_2^H \rfloor, \qquad (14)$$

whereas $$\Psi = \lfloor G_2 \tilde{D}^{-1} G_1^H \rfloor U_2, \qquad (15)$$

D is a diagonal matrix including the singular values of $U_1$. $\tilde{D}^{-1}$, is a concatenation of a square matrix of size $L_{max}$, which contains the reciprocates of the first $L_{max}$ singular values of D.

Conveniently, matrix $\Psi$ is decomposed in order to reveal its eigen-values, for each of the $L_{max}$ eigen-values the appropriate delay is extracted by: (i) extracting the phase from each complex eigen-value, (ii) mapping the phase to a value in $[0, 2\pi]$, and normalizing by multiplying by $$\frac{N}{2\pi D_f},$$

where N=2048, $D_f$=3.

Stage 140 is followed by stage 150 of locating multiple taps of the channel impulse response within error windows. Conveniently, each error window is set around an estimated location of a taps, but this is not necessarily so.

Conveniently, stage 150 provides a better estimate (higher resolution, finer granularity) of the locations of the taps.

Stage 150 starts by defining multiple error windows around each estimated delay location. The size of the error window is conveniently 2δ, whereas the one-sided width δ.

$$\delta = \left\lfloor \gamma \left( \frac{2Kp}{(2L_{max}-1)} - 1 \right) \right\rfloor \qquad (16)$$

Whereas γ is a constant that determines the proportion between the number of variables and the number of equations in the Discrete Fourier Transform matrix $\hat{W}_p$. The system of equations defined by $\hat{W}_p$ is then solved for the amplitudes of the taps contained by the error windows. In other words γ is representative of the ratio between the number of time coefficients and the number of frequency coefficients.

Conveniently γ is smaller than one but is not very small. Values of about 0.4-0.6 and especially 0.5 were used by the inventors.

Stage 150 further includes solving the following equations:

$$H_{LS,1} = \hat{W}_p h_{LS,1} \qquad (17)$$

$$H_{LS,2} = \hat{W}_p h_{LS,2} \qquad (18)$$

whereas $\hat{W}_p$ is the DFT matrix containing the necessary transition from the taps defined by the error windows to the frequency locations of the pilots.

Conveniently, for each error window, stage 150 includes setting a metric for all the tap locations: metric=$|0.5(h_{LS,1} + h_{LS,2})|^2$.

This is followed by selecting, for each error window the sample with the highest value of the metric.

Once the location of the taps is determined the amplitude of each tap is calculated, conveniently by solving the DFT equations again, with the selected taps:

$$H_{LS,1} = \tilde{W}_p \hat{h}_{LS,1} \qquad (19)$$

$$H_{LS,2} = \tilde{W}_p \hat{h}_{LS,2} \qquad (20)$$

where $\tilde{W}_p$ is the DFT matrix containing the necessary transition from the taps located by the metric and the frequency locations of the pilots.

Stage 150 conveniently provides the exact location of the taps of the channel impulse response. Stage 150 is followed by stage 160 of determining gain of the channel impulse response taps.

Stage 160 is followed by stage 170 of converting the channel impulse response estimate to a frequency channel response estimate. Referring to the subcarrier tile structure, the frequency domain channel estimation of the second symbol is the average of the frequency domain channel estimation of the first and third symbols, as expressed by equations 21-23:

$$H_{est,1}=DFT(\tilde{h}_{LS,1});\quad(21)$$

$$H_{est,3}=DFT(\tilde{h}_{LS,2});\text{ and}\quad(22)$$

$$H_{est,2}=0.5[H_{est,1}+H_{est,3}].\quad(23)$$

Figure 4:
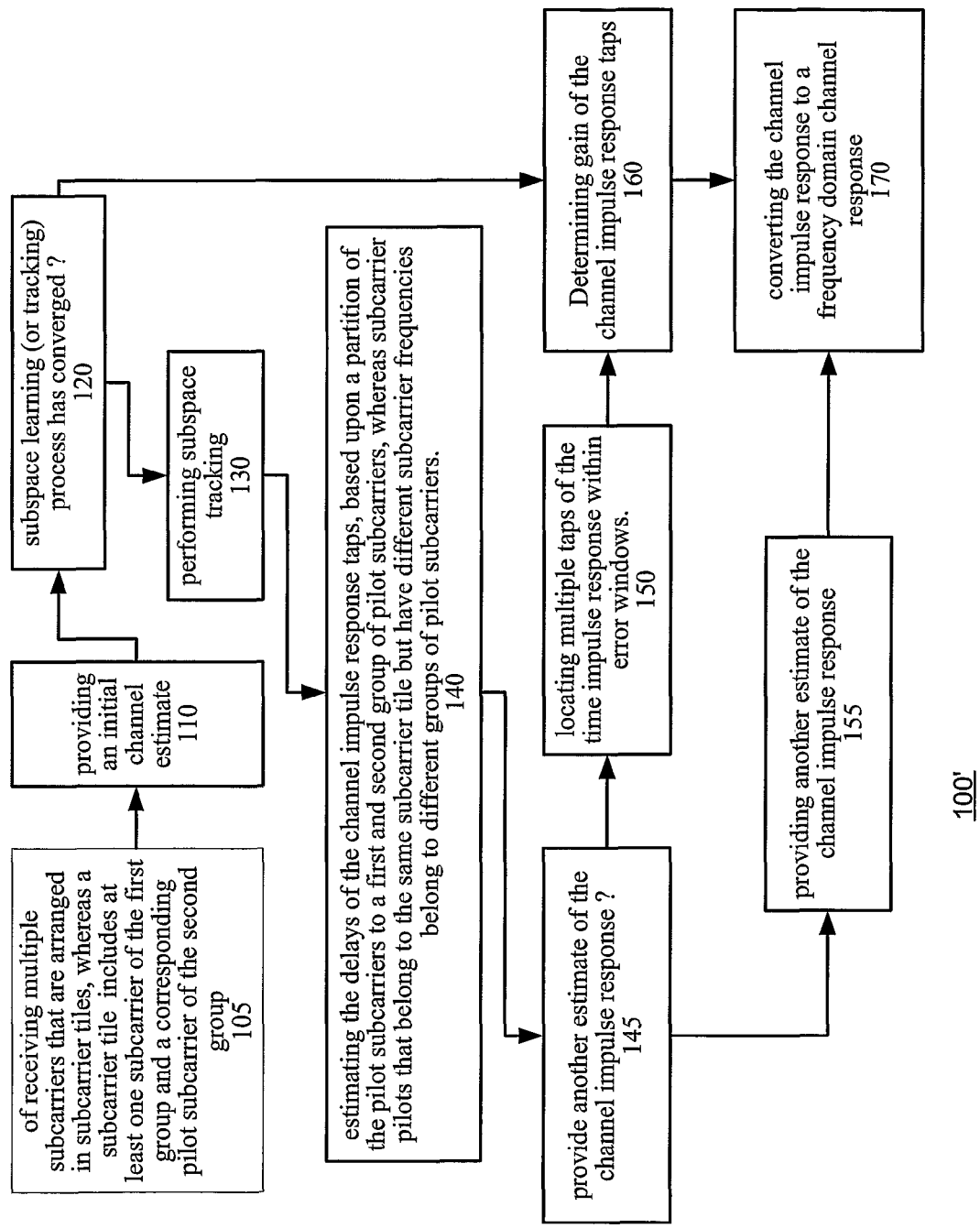
FIG. 4 illustrates a flow chart of a channel estimation method according to an embodiment of the invention.

FIG. 4 illustrates a flow chart of a method 100' for channel estimation according to an embodiment of the invention.

Method 100' differs from method 100 by further including query stage 145 of determining whether to proceed to stages 150-160 and provide a first type of channel impulse response or to provide another type of channel estimate. If the first type is required then stage 145 is followed by stage 150, else stage 145 is followed by stage 155 of providing another channel response estimate (the second type).

The inventors used stages such as stage 145 and 155 in order to provide a linear channel response estimation. The linear channel response estimation was used when the ESPRIT based algorithm did not converge. A linear frequency channel response can involve calculating the frequency channel response of all the subcarriers that belong to the user by linear averaging of the least-square estimates at pilot locations.

Figure 9:
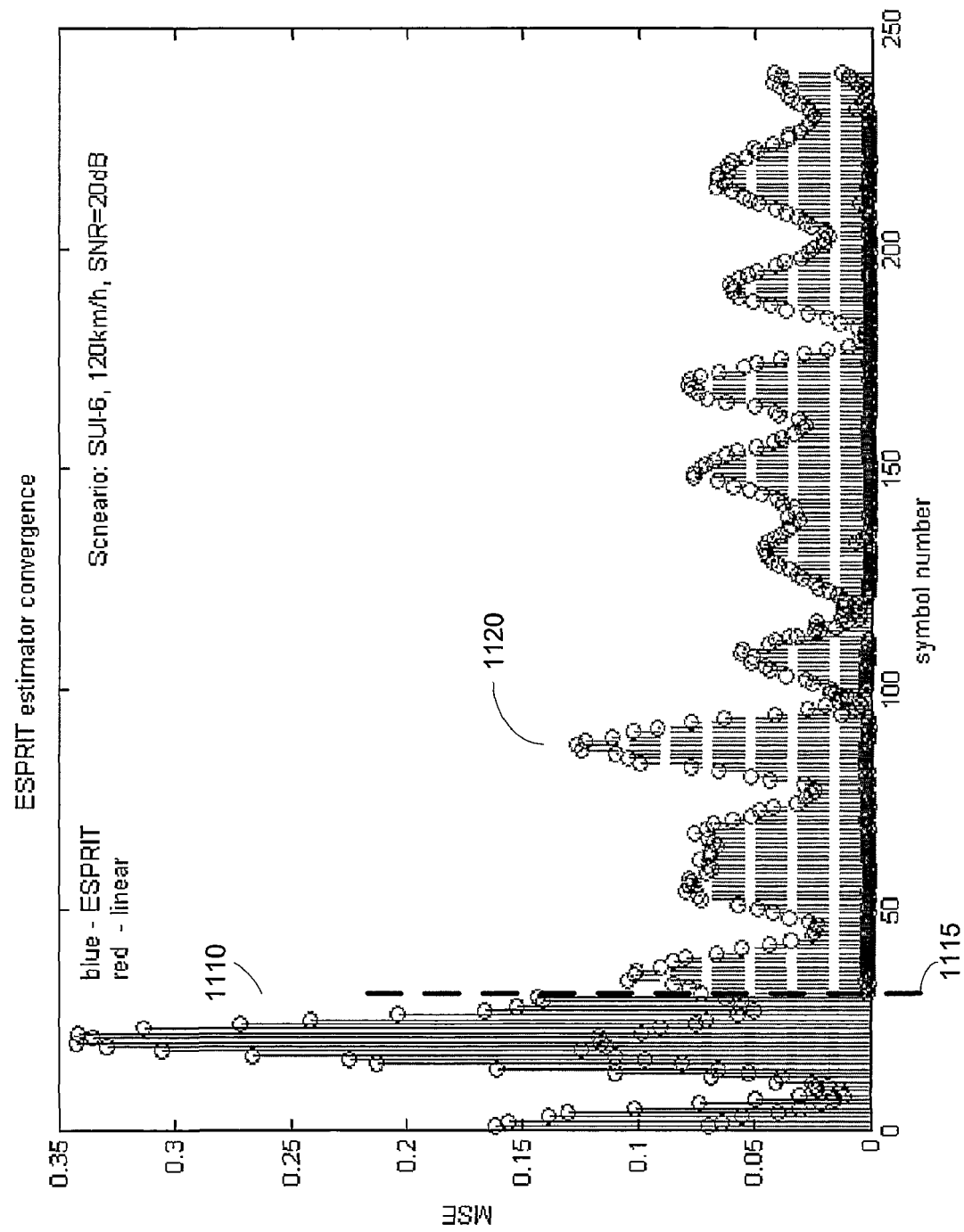
FIG. 9 illustrates a hybrid channel estimator, according to an embodiment of the invention.

Method 100' provides a hybrid channel response estimate, as illustrated in FIG. 9. Thus, during the first timeslots a linear frequency channel response estimate (represented by multiple consecutive lines 1110) was provided while during other timeslots the ESPRIT based frequency channel response estimate (multiple dashed lines 1120) was provided. Dashed vertical line 1115 illustrates the location (timeslot) during which the estimate changes from 1110 to 1120.

Figure 5:
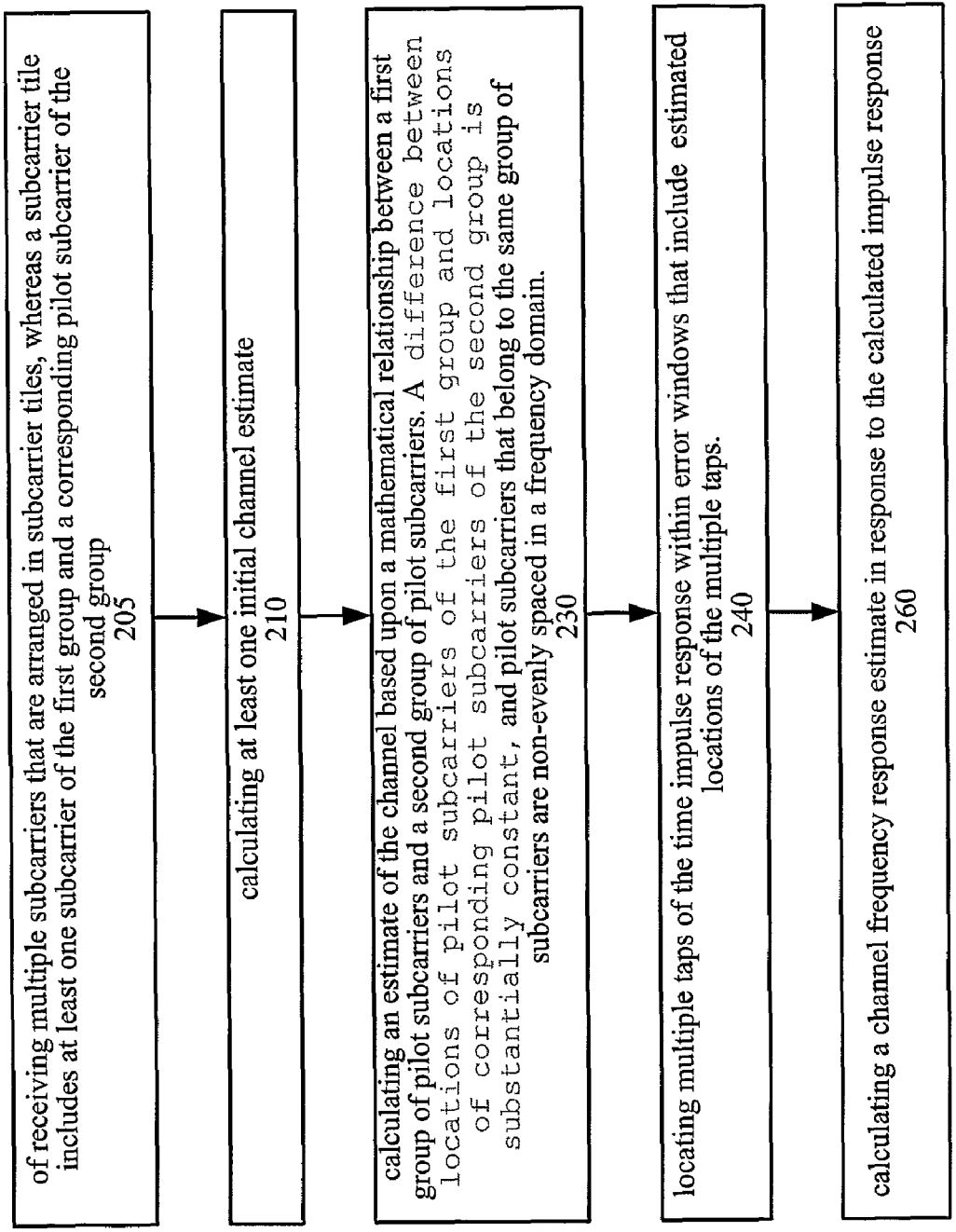
FIG. 5 illustrates a flow chart of a channel estimation method according to an embodiment of the invention.

FIG. 5 illustrates a flow chart of a channel estimation method 200, according to an embodiment of the invention.

Conveniently, method 200 starts by stage 205 of receiving multiple subcarriers that are arranged in subcarrier tiles, whereas a subcarrier tile includes at least one subcarrier of the first group and a corresponding pilot subcarrier of the second group.

Stage 205 is followed by stage 210 of calculating at least one initial channel estimate.

Stage 210 is followed by stage 230 of calculating an estimate of the channel based upon a mathematical relationship between a first group of pilot subcarriers and a second group of pilot subcarriers. The difference between locations of pilot subcarriers of the first group and locations of corresponding pilot subcarriers of the second group is substantially constant, in addition pilot subcarriers that belong to the same group of subcarriers are non-evenly spaced in a frequency domain. For example, if the pilot subcarriers are arranged in multiple pairs then the distance between the locations of two members of each pair is the same while the pairs are non-evenly spaced in the frequency domain.

Conveniently, stage 230 includes applying an ESPRIT algorithm on the two groups of pilot subcarriers.

Stage 230 is followed by stage 240 of locating multiple taps of the time impulse response within error windows that include estimated locations of the multiple taps.

Conveniently, a size of at least one error window is responsive to number of pilot subcarriers allocated to a user. Conveniently, a size of at least one error window is responsive to number of taps of the channel time impulse response. Conveniently, stage 240 includes calculating an error window time impulse response.

According to an embodiment of the invention the estimate is a channel impulse response and stage 240 is followed by stage 260 of calculating a channel frequency response estimate in response to the calculated impulse response.

Conveniently, a pilot subcarrier of the first group and a corresponding pilot subcarrier of the second group are proximate to each other in the frequency domain. This proximity is conveniently smaller than and even much smaller than the ratio between an overall bandwidth of the channel (or the overall bandwidth of the useful subcarriers) and the amount of users.

Figure 6:
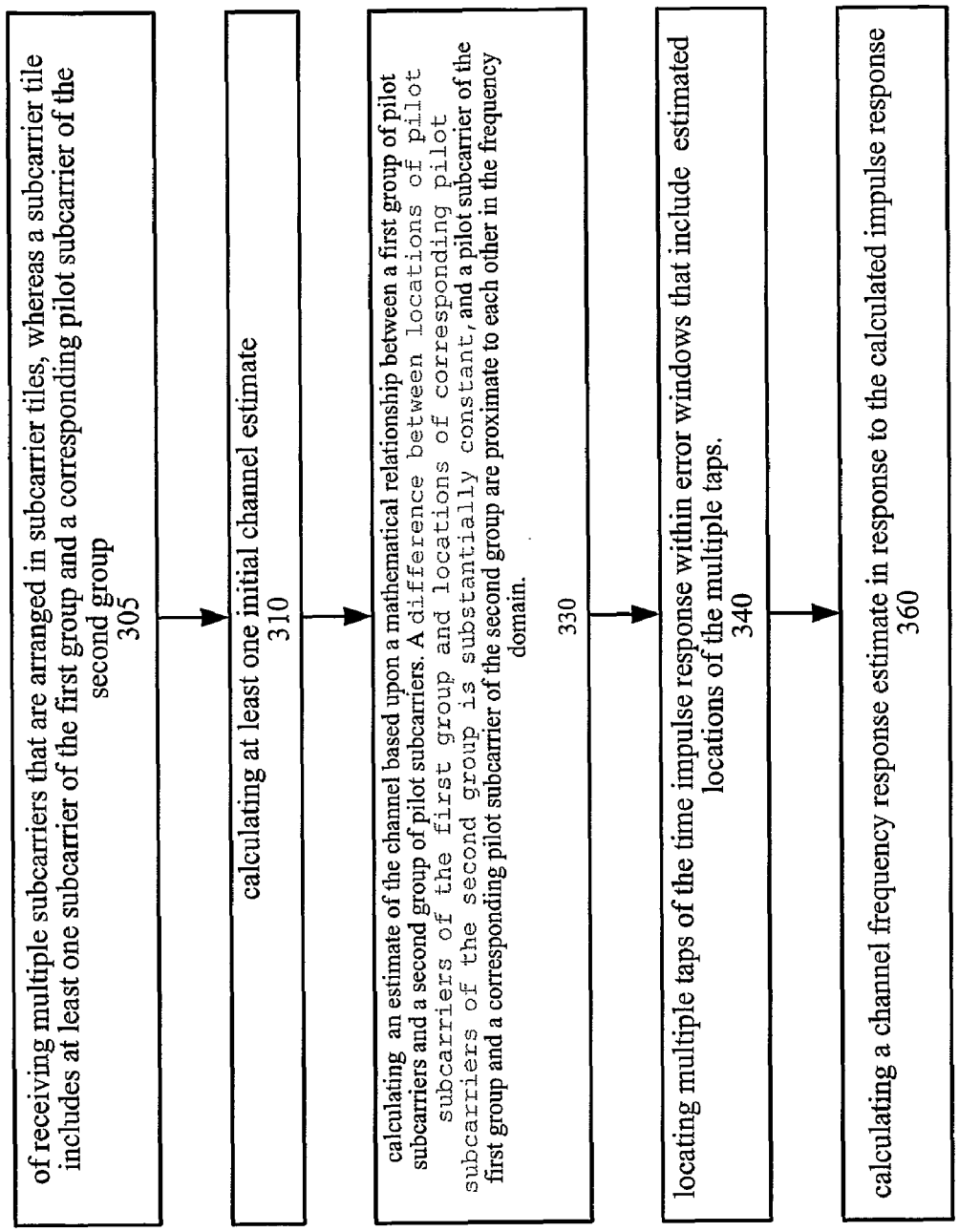
FIG. 6 illustrates a flow chart of a channel estimation method according to an embodiment of the invention.

FIG. 6 illustrates a flow chart of a channel estimation method 300, according to an embodiment of the invention.

Conveniently, method 300 starts by stage 305 of receiving multiple subcarriers that are arranged in subcarrier tiles, whereas a subcarrier tile includes at least one subcarrier of the first group and a corresponding pilot subcarrier of the second group.

Stage 305 is followed by stage 310 of calculating at least one initial channel estimate.

Stage 310 is followed by stage 330 of calculating an estimate of the channel based upon a mathematical relationship between a first group of pilot subcarriers and a second group of pilot subcarriers. A difference between pilot subcarriers of the first group and corresponding pilot subcarriers of the second group is substantially equal, and a pilot subcarrier of the first group and a corresponding pilot subcarrier of the second group are proximate to each other in the frequency domain.

Stage 330 is followed by stage 340 of locating multiple taps of the time impulse response within error windows that include estimated locations of the multiple taps.

Conveniently, a size of at least one error window is responsive to number of pilot subcarriers allocated to a user. Conveniently, a size of at least one error window is responsive to number of taps of the channel time impulse response. Conveniently, stage 240 includes calculating an error window time impulse response.

According to an embodiment of the invention the estimate is a channel impulse response and stage 340 is followed by stage 360 of calculating a channel frequency response estimate in response to the calculated impulse response.

Figure 7:
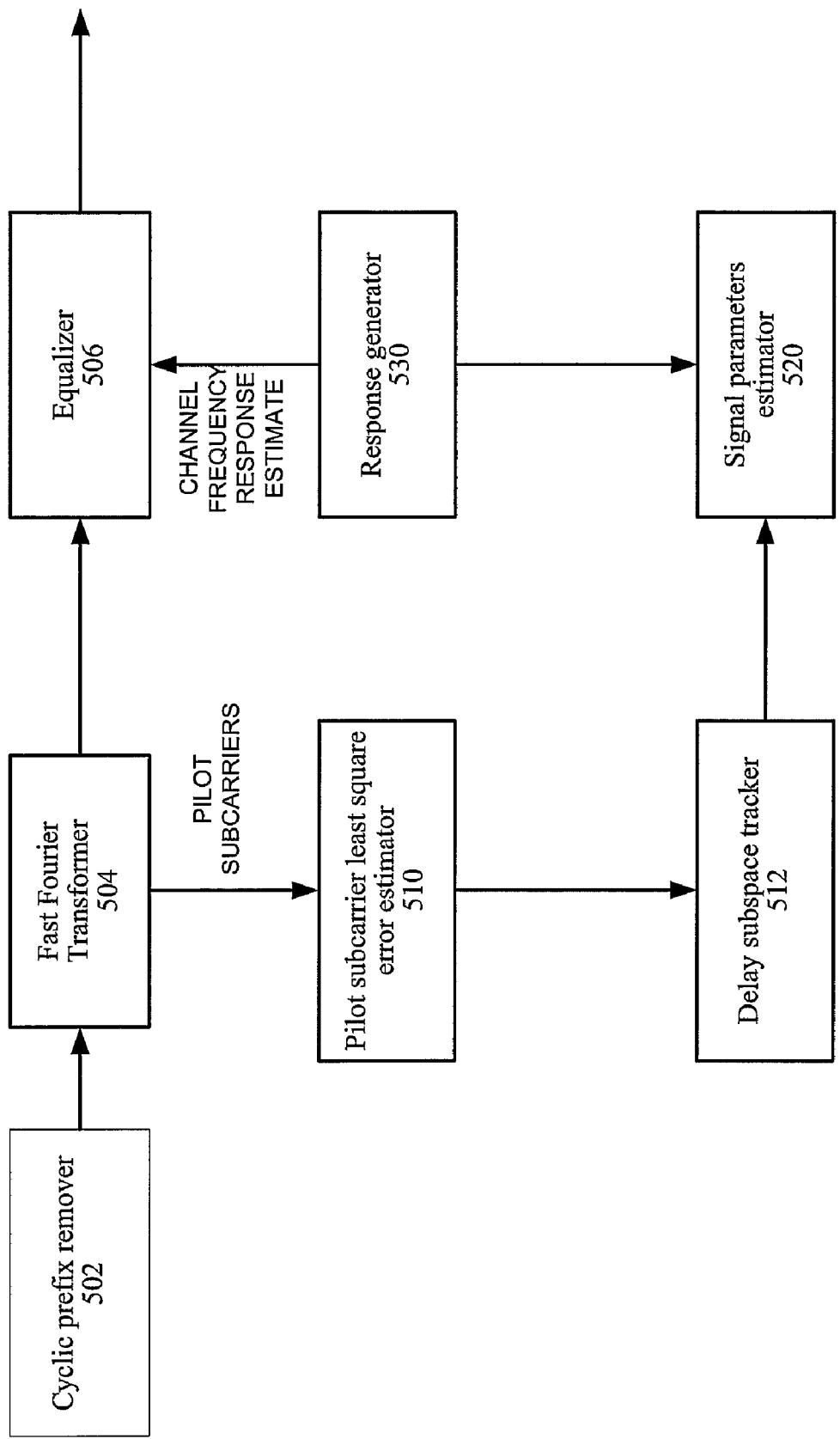
FIG. 7 illustrates a receiver according to an embodiment of the invention.

FIG. 7 illustrates a receiver 500 according to an embodiment of the invention.

Conveniently, receiver 500 can apply any method out of methods 100-300.

Receiver 500 includes a cyclic prefix remover, a time to frequency domain converter, such as Fast Fourier Transformer (FFT) 504, equalizer 506, an initial channel estimator such as pilot subcarrier least square estimator 510, a delay subspace tracker 512, a signal parameter estimator 520, and a response generator 530. Response generator 530 converts a channel impulse response to a channel frequency response.

Each of these components can be implemented by software, hardware and/or middleware. Conveniently, these components were implemented by software components that are executed by a processor such as but not limited to the StarCore processor, but this is not necessarily so.

The receiver 500 can be implemented by one or more integrated circuits, by a system on chip and the like. The receiver 500 can be a part of a wireless network base station, but this is not necessarily so.

It is further noted that receiver 500 does not necessarily include all the components 502-530, and on the other hand the receiver can include additional components.

Conveniently, the cyclic prefix remover 502 receives electronic signals and removes a cyclic prefix from an OFDM symbol. The cyclic prefix is usually added in order to simplify the reception process.

The output of the cyclic prefix remover 502 is connected to the input of FFT 504. The FFT performs a fast Fourier transform and outputs pilot symbols to pilot subcarrier least square estimator 510 while providing information conveying symbols to equalizer 506. The equalizer 506 attempts to reconstruct the transmitted information conveying symbols from the received information conveying symbols, whereas the equalizer 506 is configured according to an estimated frequency response of the wireless channel through which the symbols propagate.

Figure 1:
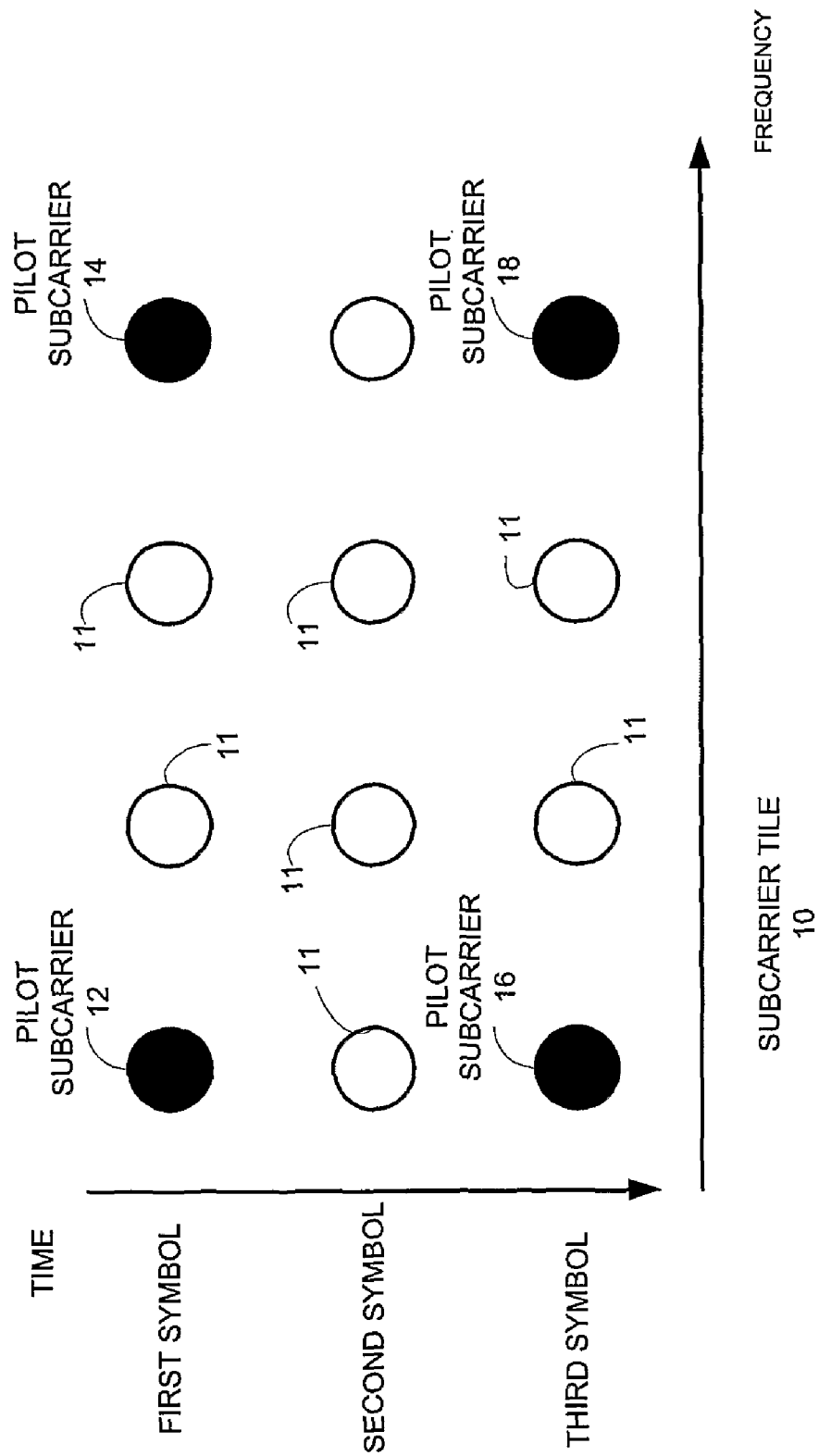
FIG. 1 illustrates a prior art symbol tile.
Figure 2:
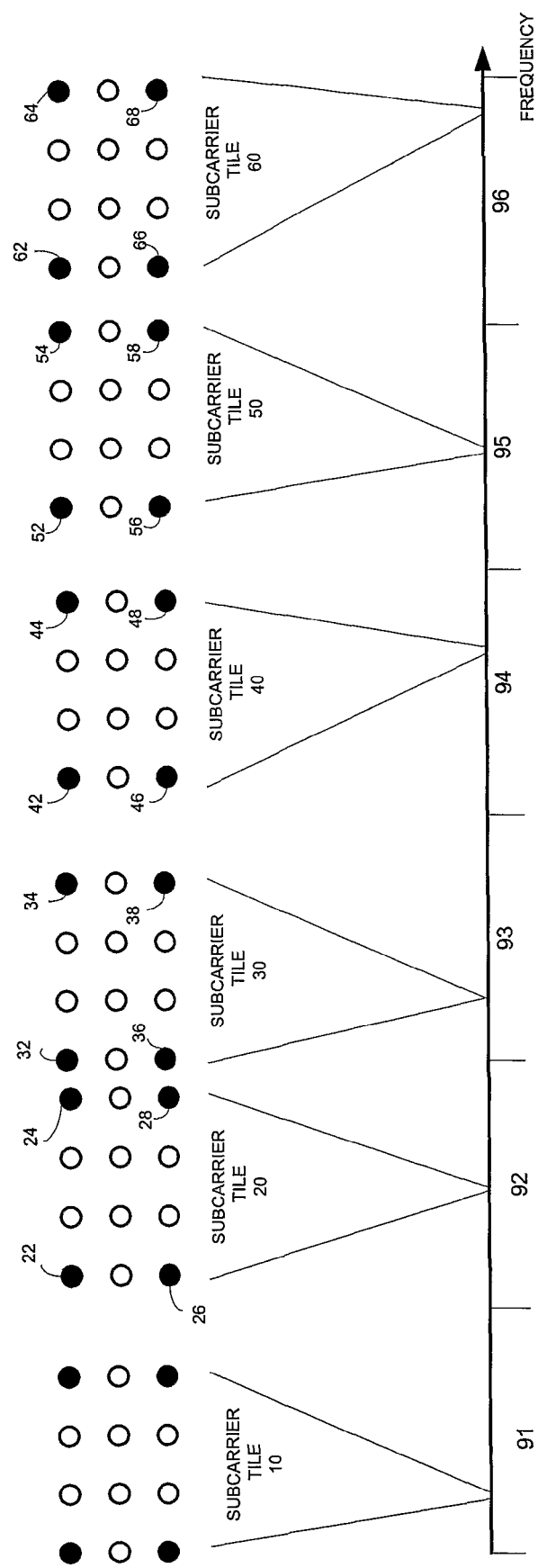
FIG. 2 illustrates multiple subcarriers tiles that are allocated to a single subchannel.

The subcarrier least square estimator 510 provides an initial channel estimate based upon the received pilot symbols. More specifically, it provides the frequency response of the channel at the pilot subcarrier frequencies. Referring to the example set forth in FIG. 2, assuming that a subcarriers tiles 10-60 are allocated to a certain subchannel then the initial channel estimate can include two vectors, one representative of the channel frequency response at pilot subcarriers 12, 14, 22, 24, 32, 34, 42, 44, 52, 54, 62 and 64, and the other vector representative of the channel frequency response at pilot subcarriers 16, 18, 26, 28, 36, 38, 46, 48, 56, 58, 66 and 68. This initial channel frequency response estimate is provided to the response generator 530 and to the delay subspace tracker 512.

The delay subspace tracker 512 applies a subspace channel algorithm in order to estimate a sub-space that is spanned by the two vectors.

According to one embodiment of the invention the signal parameter estimator 520 is adapted to calculate an estimate of the channel tap locations based upon a mathematical relationship between a first group of pilot subcarriers and a second group of pilot subcarriers. The difference (in the frequency domain) between pilot subcarriers of the first group and corresponding pilot subcarriers of the second group is substantially equal. According to various embodiments of the invention at least one of the following conditions is also fulfilled: (i) pilot subcarriers that belong to the same group of subcarriers are non-evenly spaced in a frequency domain; (ii) a pilot subcarrier of the first group and a corresponding pilot subcarrier of the second group are proximate to each other in the frequency domain.

Conveniently, the pilot subcarriers belong to subcarrier tiles, and especially to subcarrier tiles that are randomly selected from a larger number of subcarrier tiles.

Conveniently, the signal parameter estimator 520 is further adapted to locate multiple taps of the time impulse response within error windows that comprise estimated locations of the multiple taps.

Conveniently, the signal parameter estimator 520 is adapted to calculate an error window time impulse response, and/or to apply an ESPRIT algorithm on the two groups of pilot subcarriers.

It is further noted that the various stages of the method can be executed by one or more processors.

The inventors simulated a channel estimation method, according to an embodiment of the invention, in the following conditions: center frequency of the OFDMA symbol was 2.2 GHz, bandwidth of 20 MHz, number of subcarriers was 2048, including 1680 useful subcarriers, prefix cycle length was 512, fade rate (channel alteration indication) of 240 Hz, $N_s$=3, $K_p$=36. Two different channels were tested the first channel (SUI-6) includes three paths and the second channel (ITU vehicular) has six paths.

The channel estimation method 100 (referred to as inter tile) was compared to a channel estimator that based its estimate only upon single subcarrier tiles. A performance improvement of about 8 dB were gained from applying method 100.

Figure 8:
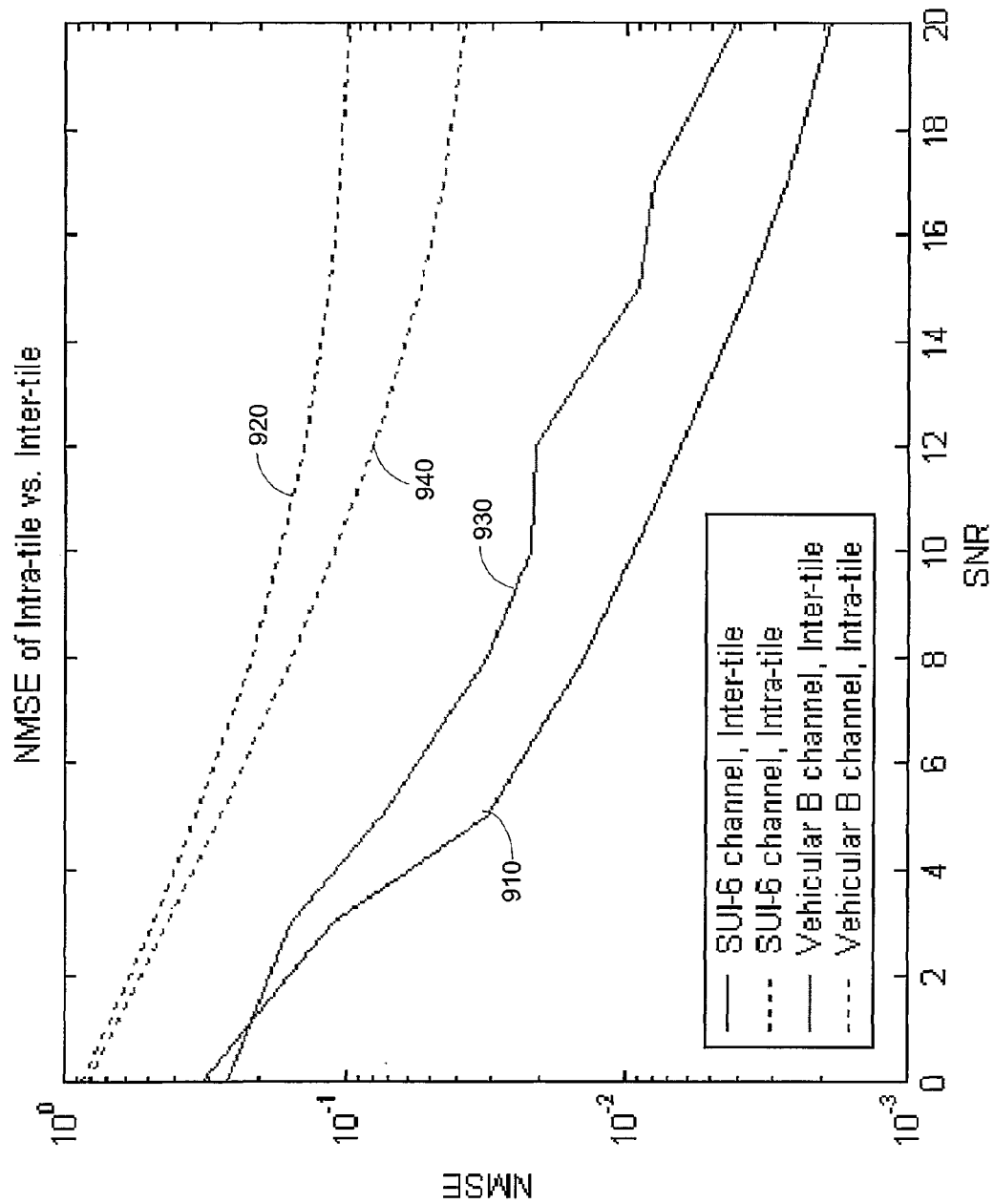
FIG. 8 illustrates a normalized mean square error of a channel estimate according to an embodiment of the invention and of a prior art channel estimate.

Curve 910 of FIG. 8 illustrates the normalized mean square error (NMSE) of method 100 based SUI-6 channel estimation, curve 920 illustrates the NMSE of an intra tile based SUI-6 channel estimation, curve 930 illustrates the NMSE of method 100 based ITU vehicular channel estimation, curve 940 illustrates the NMSE of an intra tile based ITU vehicular channel estimation.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for channel estimation, the method comprises:
calculating at least one initial channel estimate;
calculating an estimate of the channel based upon a mathematical relationship between a first group of pilot subcarriers and a second group of pilot subcarriers, wherein the first group of pilot subcarriers and the second group of pilot subcarriers are both received groups of pilot subcarriers, and at least one pilot subcarrier of the first group of pilot subcarriers and at least one pilot subcarrier of the second group of pilot subcarriers are included in a subcarrier tile; and
determining a size of an error window based on a number of pilot subcarriers allocated to
a user, wherein the error window includes estimated locations of multiple taps of a time impulse response;
wherein a difference between locations of pilot subcarriers of the first group and locations of corresponding pilot subcarriers of the second group is substantially constant; and
wherein pilot subcarriers that belong to the same group of subcarriers are non-evenly spaced in a frequency domain.

2. The method according to claim 1 further comprises receiving multiple subcarriers that are arranged in subcarrier tiles, wherein a subcarrier tile comprises at least one subcarrier of the first group and a corresponding pilot subcarrier of the second group.

3. The method according to claim 1 further comprising locating the multiple taps of the time impulse response within the error.

4. The method according to claim 3 wherein a size of at least one error window is responsive to number of taps of the channel time impulse response.

5. The method according to claim 3 wherein the locating comprises calculating an error window time impulse response.

6. The method according to claim 1 wherein the estimate of the channel is a channel impulse response and wherein the method further comprises calculating a channel frequency response estimate in response to the calculated impulse response.

7. The method according to claim 1 wherein the calculating as estimate of the channel comprises applying an ESPRIT algorithm on the two groups of pilot subcarriers.

8. The method according to claim 1 wherein a pilot subcarrier of the first group and a corresponding pilot subcarrier of the second group are proximate to each other in the frequency domain.

9. The method according to claim 1 wherein pilot subcarriers of the first group of pilot subcarriers belong to different subcarrier tiles.

10. A method for channel estimation, the method comprises:
   calculating at least one initial channel estimate; and
   calculating an estimate of the channel based upon a mathematical relationship between a first group of pilot subcarriers and a second group of pilot subcarriers, wherein the first group of pilot subcarriers and the second group of pilot subcarriers are both the received group of pilot subcarriers, and at least one pilot subcarrier of the first group of pilot subcarriers and at least one pilot subcarrier of the second group of pilot subcarriers are included in a subcarrier tile; and
   determining a size of an error window based on a number of pilot subcarriers allocated to
      a user, wherein the error window includes multiple taps of a time impulse response;
   wherein a difference between locations of pilot subcarriers of the first group and locations of corresponding pilot subcarriers of the second group is substantially constant; and
   wherein a pilot subcarrier of the first group and a corresponding pilot subcarrier of the second group are proximate to each other in the frequency domain.

11. The method according to claim 10 wherein the difference between a pilot subcarrier of the first group and a corresponding pilot subcarrier of the second group is substantially smaller than a ratio between an overall bandwidth allocated to the first and second groups of subcarriers and between an amount of users.

12. The method according to claim 10 wherein pilot subcarriers that belong to the same group of subcarriers are non-evenly spaced in a frequency domain.

13. The method according to claim 10 further comprising locating the multiple taps of the time impulse response within the error window.

14. The method according to claim 10 further comprises receiving multiple subcarriers that are arranged in subcarrier tiles, wherein a subcarrier tile comprises at least one pilot subcarrier of the first group and a corresponding pilot subcarrier of the second group.

15. The method according to claim 10 wherein pilot subcarriers of the first group of pilot subcarriers belong to different subcarrier tiles.

16. A receiver comprising:
   an initial channel estimator; and
   a signal parameter estimator adapted to calculate an estimate of channel tap locations based upon a mathematical relationship between a first group of pilot subcarriers and a second group of pilot subcarriers, and to determine a size of an error window based on a number of pilot subcarriers allocated to a user, wherein the error window includes estimated locations of multiple taps of a time impulse response, wherein the first group of pilot subcarriers and the second group of pilot subcarriers are both received groups of pilot subcarriers, and at least one pilot subcarrier of the first group of pilot subcarriers and at least one pilot subcarrier of the second group of pilot subcarriers are included in a subcarrier tile;
   wherein a difference between locations of pilot subcarriers of the first group and locations
      of corresponding pilot subcarriers of the second group is substantially constant; and
   wherein pilot subcarriers that belong to the same group of subcarriers are non-evenly spaced in a frequency domain.

17. The receiver according to claim 16 wherein the signal parameter estimator is further adapted to locate the multiple taps of the time impulse response within the error window.

18. The receiver according to claim 17 wherein signal parameter estimator is adapted to calculate an error window time impulse response.

19. The receiver according to claim 16 wherein the signal parameter estimator is further adapted to apply an ESPRIT algorithm on the two groups of pilot subcarriers.

20. The receiver according to claim 16 wherein a pilot subcarrier of the first group and a corresponding pilot subcarrier of the second group are proximate to each other in the frequency domain.

* * * * *